United States Patent
Shepherd

[15] 3,654,849
[45] Apr. 11, 1972

[54] LIGHTING UNIT STRUCTURE AND ARRANGEMENT COMPRISING A PLURALITY OF SUCH STRUCTURES

[72] Inventor: Charles G. Shepherd, Oakville, Ontario, Canada

[73] Assignee: Wilson Lighting Limited, Toronto, Ontario, Canada

[22] Filed: Nov. 6, 1969

[21] Appl. No.: 874,140

[52] U.S. Cl. .................................. 98/40 DL, 52/28, 240/47
[51] Int. Cl. ......................................................... F21s 3/14
[58] Field of Search ................. 52/484, 28; 98/40 D, 40 DL, 98/114; 240/47

[56] References Cited

UNITED STATES PATENTS

| | | | |
|---|---|---|---|
| 3,108,529 | 10/1963 | Sweetser | 98/40 DL |
| 3,327,606 | 6/1967 | Little et al | 98/40 D |
| 3,401,623 | 9/1968 | Waeldner | 98/40 DL |
| 3,419,714 | 12/1968 | Slauer | 98/40 DL X |
| 3,426,188 | 2/1969 | Baranowski | 52/484 X |
| 3,334,568 | 8/1967 | Morrison | 98/40 DL |

Primary Examiner—Frank L. Abbott
Assistant Examiner—Henry E. Raduazo
Attorney—Maybee and Legris

[57] ABSTRACT

An arrangement of adjacently disposed lighting unit structures in which in each structure a member comprising part of a lighting element rigidly interconnects spaced end walls, the lighting element including a fluorescent lighting lamp or lamps which are supported by the member. Each end wall includes an inner wall portion together with side flange portions which project outwardly from the inner wall portion, the side flange portions of each end wall having outer edges which are secured in an air-tight manner to the outer edges of the side flange portions of the adjacent end wall of the adjacently disposed, lighting unit structure. An air chamber is thus provided between these adjacent end walls, a ventilation air inlet to the air chamber being provided, and the inner wall portion of each end wall having a lower edge which is so disposed inwardly of the outer edges of the side flange portions of the end wall that a ventilation air outlet is thereby provided between the lower edge and the lower edge of the inner wall portion of the adjacent end wall of the adjacently disposed lighting unit structure.

7 Claims, 4 Drawing Figures

INVENTOR.
CHARLES G. SHEPHERD

BY *Maybee & Legris*

ATTORNEYS

INVENTOR
CHARLES G. SHEPHERD
BY Maybee & Legris
ATTORNEYS

LIGHTING UNIT STRUCTURE AND ARRANGEMENT COMPRISING A PLURALITY OF SUCH STRUCTURES

This invention is concerned with a lighting unit structure, and with an arrangement comprising a plurality of such structures which are adjacently disposed relative to one another.

In many modern buildings, such as buildings which are specifically intended to be used as, for example, commercial offices or schools, it has been conventional practice to provide, at a spaced distance below each support deck, such as each flooring deck, a ceiling comprising a support structure, the support structure being formed, for example, of a plurality of interconnected beams constituting a grid. The support structure, which may be suspended from the support deck, operatively supports a plurality of adjacently disposed lighting units, such as fluorescent lighting units. It is, furthermore, conventional in such constructions to provide spaces between the adjacent ends of the adjacently disposed lighting units, air boots which constitute structures defining air chambers being operatively positioned within at least selected ones of said spaces. The air boots are each formed with a ventilation air inlet through which air having the desired temperature and humidity may be supplied to the air chamber from a suitably located source of such air within the building by means, for example, of interconnecting ducting. Each air boot is also formed in the lower portion thereof with a ventilation air outlet through which the air which is supplied to the air chamber in the above-described manner may flow into the room space or the like below the ceiling constituted by the support structure and lighting units.

In the constructions of the above-described type which have hitherto been proposed and used the air boots have been constituted by structures which are entirely separate and distinct from the lighting unit structures. A typical example of such a construction is that disclosed in U.S. Pat. No. 3,397,499 which issued on Aug. 20, 1968 to Ward, particular reference being made to the construction illustrated in FIG. 13 of this patent from which it will be noted that the air boot denoted by the reference numeral 184 constitutes an entirely separate and distinct structure from the lighting unit structures each of which includes a base 28.

While such hitherto proposed and used constructions operate satisfactorily, it is believed that these constructions are unnecessarily complex and it is accordingly a primary object of the present invention to provide a lighting unit structure, and an arrangement comprising a plurality of such structures which are adjacently disposed relative to one another, in which the structure, or each structure, is of considerably simplified form and is hence considerably less expensive to manufacture and install, while still achieving the advantages of the above-described hitherto proposed and used constructions, the air boot between adjacent lighting unit structures in said arrangement being integrally formed with said adjacent lighting unit structures.

In order that the invention may be more clearly understood and more readily carried into effect the same will now, by way of example, be more fully described with reference to the accompanying drawings in which.

Figure 1:
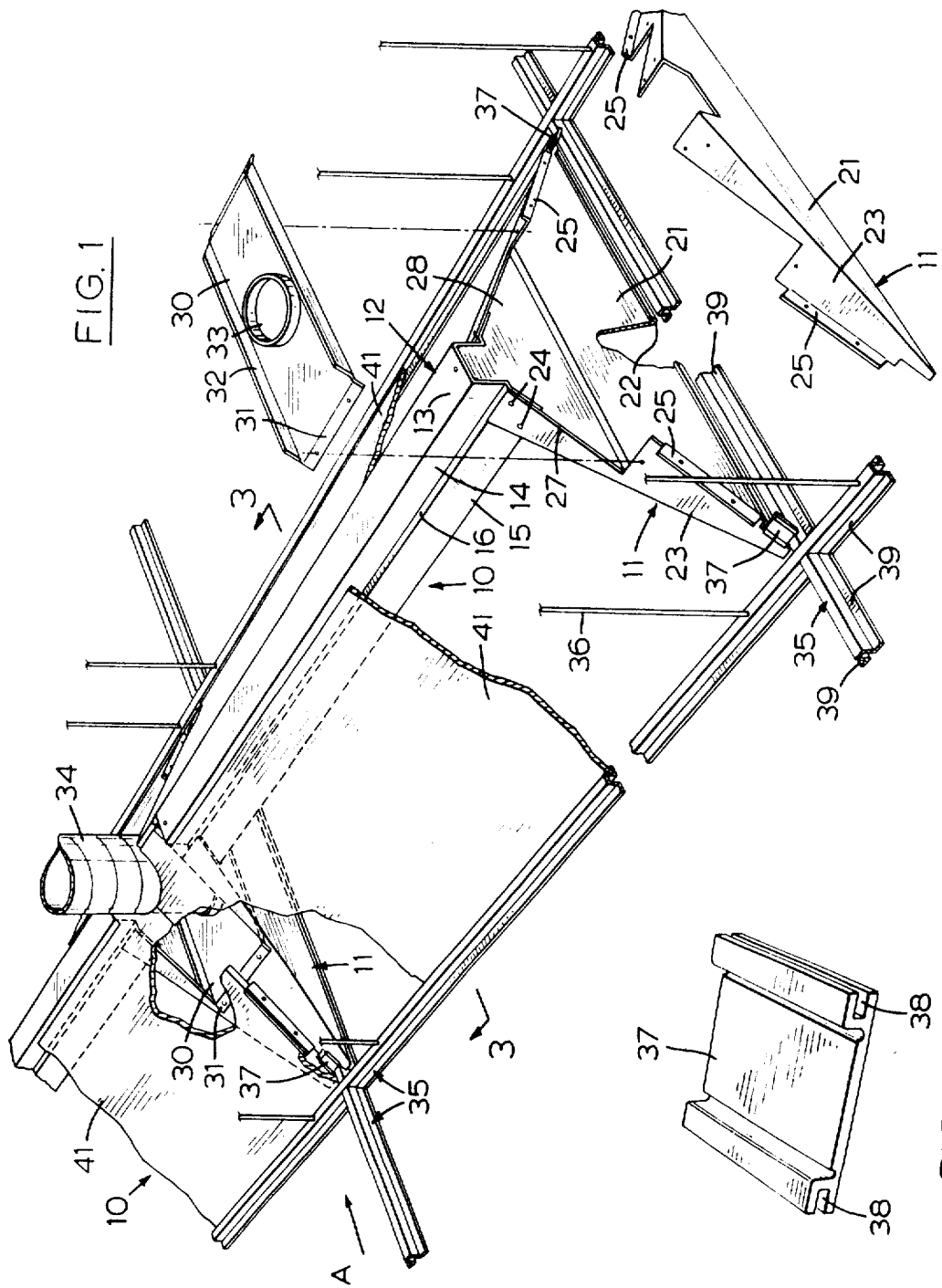
FIG. 1 is a perspective view from above showing elements of a plurality of adjacently disposed lighting units, some of the elements being broken away for clarity.

With reference to the drawings, 10 denotes generally each of two lighting unit structures, only the forward portion of the rear lighting unit structure 10 (as viewed in FIG. 1) being illustrated.

The lighting unit structures 10 are substantially identical and each comprises spaced end walls which are denoted generally by the reference numeral 11, and a member 12 which, in the preferred embodiment illustrated in the drawings, constitutes part of a lighting element and comprises a web portion 13, a pair of opposed, parallel limb portions 14 and a pair of outwardly inclined flange portions 15, the portions 15 being connected to the limb portions 14 through ledges 16.

Figure 3:
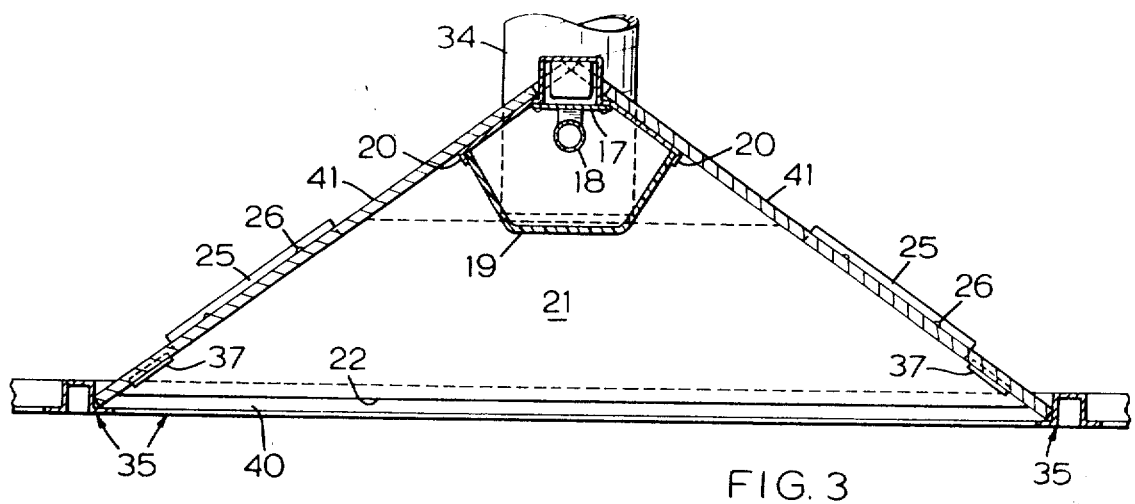
FIG. 3 is a sectional view on the line 3—3 of FIG. 1.

As shown in FIG. 3, a closure plate 17 is secured to the undersides of the ledges 16 of each member 12, a lamp, which is preferably in the form of a fluorescent lighting lamp 18, being mounted on the underside of the plate 17. The plate 17 and the lamp 18 constitute further parts of the above-mentioned lighting element. Although, in the preferred embodiment of the invention illustrated in the accompanying drawings, the lighting element in each structure 10 includes only one lamp 18 mounted on the member 12, it will be appreciated that, in alternative embodiments (not shown), a plurality of such lamps 18 may be so mounted.

The space bounded by the web and limb portions 13, 14 of each member 12 and by the plate 17 operatively contains the ballast and other auxiliary circuit elements of the lighting element. These circuit elements may be of conventional form. A translucent lens 19 is mounted on each member 12 and is operatively retained in position by means of inwardly directed edge portions 20 of the inclined flange portions 15.

Each end wall 11 comprises an inner wall portion 21 which is inwardly inclined in an upward direction from the lower edge 22 thereof, and side flange portions 23 which project outwardly from the inner wall portion 21.

In each structure 10 the member 12 rigidly interconnects the associated end walls 11 by means of, for example, bolts 24 between the inclined flange portions 15 of the member 12 and the side flange portions 23 of the end walls 11.

Figure 4:
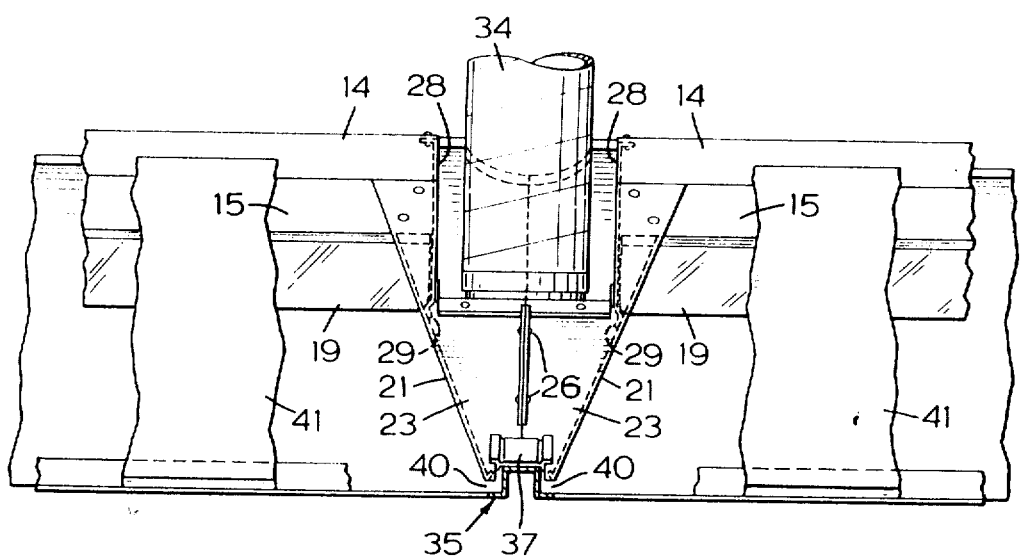
FIG. 4 is a side view in the direction of the arrow A of part of the arrangement illustrated in FIG. 1, some of the elements again being broken away for clarity.

The side flange portions 23 of each end wall 11 have outer edges constituted by upstanding ribs 25 which are secured, in a substantially air-tight manner, to the upstanding ribs 25 of the side flange portions 23 of the adjacent end wall 11 of an adjacently disposed lighting unit structure 10 by means, for example, of bolts 26 (FIG. 4).

The outer edges constituted by the upstanding ribs 25 of the side flange portions 23 of each end wall 11 are disposed in a substantially vertical plane so that the side flange portions 23 are of progressively increasing breadth in an upward direction, the side flange portions 23 of each end wall 11 being, in the preferred embodiment of the invention illustrated in the accompanying drawings, of notched form, as indicated by the reference numeral 27, at the upper portions thereof remote from the inner wall portion 21. A substantially vertical closure plate 28 is secured to the side flange portions 23 of each end wall 11 at the notched portions 27 thereof, the lower edge 29 of the plate 28 being secured in a substantially air-tight manner to the inner wall portion 21, as shown most clearly in FIG. 4. Furthermore, in each structure 10, a substantially horizontal closure plate 30 is secured, in a substantially air-tight manner, partially to the side flange portions 23, at the notched portions 27 thereof, of each end wall 11 and partially to the side flange portions 23, at the notched portions 27 thereof, of the adjacent end wall 11 of the adjacent lighting unit structure 10. These substantially air-tight securements between the plate 30 and the side wall flanges 23 are effected between downwardly inclined end portions 31 of the plate 30 and the side flange portions 23. Each plate 30 also presents upstanding lateral flange portions 32 which, as shown in FIG. 4, are disposed in substantially air-tight abutting contact with the plates 28 of adjacent end walls 11 of the adjacent lighting unit structures 10.

Each end portion of the lens 19 is disposed through a correspondingly formed opening in the inner wall portion 21 of the appropriate end wall 11, the lens 19 being mounted on the lower edge 29 of the plate 28 which is secured to said inner wall portion 21.

An air chamber which is bounded by an air boot is constituted by the space between adjacent end walls 11 of adjacent lighting unit structures 10, i.e. by, with reference to the preferred embodiment illustrated in the drawings, the space bounded by the plate 30 and the parts of the inner wall portions 21 and the side flange portions 23 of the adjacent end walls 11 which are disposed below the plate 30, the air boot thus comprising, in this preferred embodiment illustrated in the drawings, the plate 30 and said parts of the inner wall portions 21 and of the side flange portions 23. Each end wall 11 is so formed that a ventilation air inlet to this air chamber is provided, this inlet being constituted, in the preferred embodiment illustrated in the drawings, by an opening 33 formed in each plate 30. Thus, the ventilation air inlet is provided in the air boot for the admission of ventilation air to the air chamber. Ducting 34 is operatively connected to the openings 33 in some or all of the plates 30, the ducting 34 serving to convey air having the desired temperature and humidity to the appropriate air chambers from a convenient source (not shown) thereof. In any particular installation, if certain of the air chambers are not required the closure plates 30 bounding these chambers may be omitted, in which case these chambers serve as air return passages.

The purpose of the notched portions 27 in the side flange portions 23 of the end walls 11, and of the associated closure plates 28 and 30, is to permit increased flexibility in the manner in which the lighting unit structures 10 may be used. Thus, for example, where it is desired to use the structures 10 in such a manner that the members 12 thereof are disposed substantially at right angles to horizontal beams or girders, such as girders supporting the ceiling, and where it is required that the level of the upper faces of the members 12 be above the lower faces of these beams or girders, the beams or girders are disposed through the spaces bounded by the plates 28 and 30 of adjacent end walls 11. Where beams or girders are so disposed it is not, of course, possible for the associated air chambers to be used, or if they are to be used an alternative arrangement (not shown) to that constituted by the openings 33 in the plates 30 will be required for supplying the air to the chambers.

It is to be emphasized that the above-described manner of using the lighting unit structures 10 in which beams or girders are disposed through the spaces bounded by the plates 28 and 30 of adjacent end walls 11 is merely one example of the ways in which the structures 10 may be used where the notched portions 27 in the side flange portions 23 of the end walls 11, or notched portions of different forms, are provided.

Furthermore, it is, of course, to be understood that where notched portions in the side flange portions 23 of each end wall 11 are not required, such as where the above problem resulting from the presence of horizontal beams or girders does not arise, the notched portions in the side flange portions 23 of each end wall 11, and the associated closure plates 28 and 30, may be omitted, and that these are not, therefore, essential features of the present invention.

The lower edge 22 of the inner wall portion 21 of each end wall 11 is so disposed, inwardly of the outer edges constituted by the upstanding ribs 25 of the side flange portions 23, that a ventilation air outlet from the associated air chamber is provided between the lower edge 22 and the corresponding lower edge 22 of the adjacent end wall 11 of the adjacently disposed lighting unit structure 10. The air boot is thus provided with a ventilation air outlet for the discharge of ventilation air from the air chamber.

Figure 2:
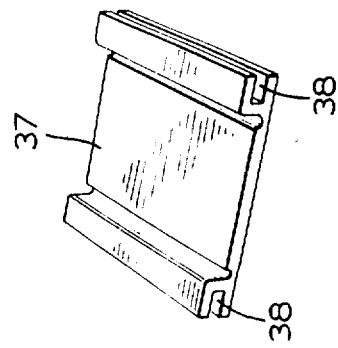
FIG. 2 is a perspective view on an enlarged scale of one of the elements incorporated in the arrangement illustrated in FIG. 1.

A support structure comprising a plurality of interconnected beams 35 constituting a grid is suspended by means of tie members 36 from, for example, a flooring support deck, spacing members 37, one of which is shown on an enlarged scale in FIG. 2, supporting the lighting unit structures 10 on the support structure comprising the beams 35. As shown in FIG. 2, each member 37 is in the form of a plate the opposed side edges of which are provided with grooves 38, the parts of adjacent side flange portions 23 of adjacent end walls 11 below the upstanding ribs 25 thereof being disposed within the grooves 38. The lower edge of each member 37 is supported on one of the beams 35 thereby to space the lower edges 22 of the inner wall portions 21 of adjacent end walls 11 of adjacent structures 10 above outwardly directed flange portions 39 of the appropriate beam 35 by pre-determined distances which constitute ventilation air outlet slots 40 for the flow of air from the air chamber to the room space or the like disposed therebelow. The depth of the slots 40 may be varied by using members 37 of different heights. Furthermore, the members 37 may be formed of a heat-fusible material such that if these members attain a pre-determined high temperature as a result, for example, of a fire in the room space or the like therebelow, the members 37 melt with resultant lowering of the lighting unit structures 10 until the lower edges 22 of the inner wall portions 21 enter into abutting contact with the portions 39 of the beams 35 thereby to prevent the travel of the fire upwards through the air chambers. Such an arrangement forms the subject of my co-pending application Ser. No. 006,673 filed on Jan. 29, 1970.

Furthermore, the support structure constituted by the beams 35 may be in the form of one of the support structures disclosed in my co-pending application Ser. No. 874,138 filed on Nov. 6, 1969.

Heat insulation panels 41 are each mounted with the lower edge portions thereof in supported engagement with the flange portion 39 of one of the beams 35 and with the upper edge portion thereof in supported engagement with the appropriate inclined flange portion 15 of the member 12 of the appropriate structure 10. The lower faces of the panels 41 are preferably formed of a light reflecting material whereby to reflect the light from the fluorescent lighting lamp 18 of the associated lighting element into the room space or the like disposed therebelow.

The present invention thus provides a lighting unit structure, and an arrangement of such structures which are adjacently disposed relative to one another, in which the air boots which define the ventilation air chambers are integrally formed with the lighting unit structures and are, as a result, less complex, and hence less expensive to manufacture and install, than the above-described hitherto proposed and used forms of construction.

What I claim as my invention is:

1. A lighting unit structure comprising spaced end walls and a member which rigidly interconnects the end walls and which is adapted to support at least one lamp, each end wall including an inner wall portion and side flange portions which project outwardly from the inner wall portion, the side flange portions of each end wall having outer edges, the inner wall portion of each end wall having a lower edge disposed inwardly of said outer edges of said side flanges and the inner wall portion of each end wall being inwardly and upwardly inclined from the lower edge thereof, said outer edges of said side flange portions of each end wall being disposed in a substantially vertical plane so that said side flange portions are of progressively increasing breadth in an upward direction whereby said outer edges are adapted to be secured in a substantially air-tight manner to the outer edges of the side flange portions of an adjacently disposed, like lighting unit structure to provide an air chamber between the adjacent end walls and a ventilation of air outlet between the lower edges of adjacent end walls and space thereabove for means defining an inlet to said chamber.

2. A lighting unit structure according to claim 1, further comprising a support structure comprising a plurality of interconnected beams constituting a grid, spacing members being connected one to each side flange portion of each end wall, and each spacing member being supported on one of said beams thereby to space the lower edge of the inner wall portion of the associated end wall above a portion of said beam by a pre-determined distance which constitutes a ventilation air outlet slot.

3. An arrangement of adjacently disposed lighting unit structures, each structure comprising spaced end walls, and a member which rigidly interconnects the end walls and which is adapted to support at least one lamp, each end wall including an inner wall portion and side flange portions which project outwardly from the inner wall portion, the side flange portions of each end wall having outer edges which are secured in a substantially air-tight manner to the outer edges of the side flange portions of the adjacent end wall of the adjacent lighting unit structure, an air chamber thereby being provided between said adjacent end walls of adjacent lighting unit structures, means providing a ventilation air inlet to said air chamber, and the inner wall portion of each end wall having a lower edge which is so disposed inwardly of the outer edges of the side flange portions of said end wall that a ventilation air outlet is provided between said lower edge and the lower edge of the inner wall portion of the adjacent end wall of the adjacent lighting unit structure.

4. An arrangement according to claim 3, wherein the inner wall portion of each end wall of each lighting unit structure is inwardly inclined in an upward direction from the lower edge thereof, the outer edges of the side flange portions of each end wall being disposed in a substantially vertical plane so that the side flange portions are of progressively increasing breadth in an upward direction.

5. An arrangement according to claim 4, wherein the side flange portions of each end wall of each lighting unit structure are, at the upper portions thereof remote from the inner wall portion of said end wall, of notched form, a substantially vertical closure plate being secured to the side flange portions at the notched portions thereof with the lower edge of said plate being secured in a substantially air-tight manner to the inner wall portion of said end wall, and a substantially horizontal closure plate, in which an opening constituting the ventilation air inlet is provided, being adapted to be secured in a substantially air-tight manner partially to said side flange portions at the notched portions thereof, partially to the side flange portions, at the notched portions thereof, of the adjacent end wall of the adjacent lighting unit structure, and to the substantially vertical closure plates of adjacent end walls of the adjacent lighting unit structures.

6. An arrangement according to claim 3, further comprising a support structure comprising a plurality of interconnected beams constituting a grid, spacing members being connected to the side flange portions of the end walls of the lighting unit structures, and being supported on said beams thereby to space the lower edges of the inner wall portions of the end walls of the lighting unit structures above portions of the beams by pre-determined distances which constitute ventilation air outlet slots.

7. An arrangement of adjacently disposed lighting unit structures, each structure being adapted to support at least one lamp and comprising spaced end walls and a member interconnecting the end walls, each end wall including an inner wall portion and side flange portions which project outwardly from the inner wall portion, the side flange portions of each end wall having outer edges which are secured in a substantially airtight manner to the outer edges of the side flange portions of the adjacent end wall of the adjacent lighting unit structure, thereby defining an air chamber bounded by said adjacent end walls and said flange portions of said adjacent lighting unit structures, and means defining a ventilation air inlet to said chamber and means defining a ventilation air outlet from said chamber.

* * * * *